Feb. 16, 1937. F. KUHN ET AL 2,070,604

THERMOSTAT

Filed Feb. 15, 1932

INVENTORS
Frank Kuhn
Laurence H. Thomas
BY
Whittemore Hulbert Whittemore
+ Belknap
ATTORNEYS Patented Feb. 16, 1937

2,070,604

UNITED STATES PATENT OFFICE 2,070,604

THERMOSTAT

Frank Kuhn, Detroit, and Laurence H. Thomas, Birmingham, Mich., assignors to American Electrical Heater Company, Detroit, Mich., a corporation of Michigan Application February 15, 1932, Serial No. 593,170

5 Claims. (Cl. 219—25)

The invention relates to thermostats designed for use in connection with electrical heating devices and to control the temperature thereof by the opening and closing of the heating circuit. The invention is more particularly adapted for use in connection with laundry irons and has for its object a more exact regulation of the temperature in accordance to the work being performed.

In electrically heated laundry irons it is usual to place the heating unit above the base of the iron, the heat being transmitted by conduction through said base to the lower or ironing surface thereof. The temperature of this ironing surface depends first upon the rate of generation of heat in the unit, and second, upon the rate of dissipation or absorption in performing the work. Thus if the articles being ironed are relatively dry the rate of heat dissipation will be correspondingly low. On the other hand, where the articles contain a greater amount of moisture, the heat dissipation is more rapid and the temperature of the ironing surface will be lower. One of the principal difficulties in satisfactorily controlling the temperature of the iron by a thermostat is not only to prevent overheating where the rate of dissipation is low, but also to maintain a sufficiently high temperature in the ironing surface when the rate of heat dissipation is high.

The present invention is adapted to overcome this difficulty by a construction in which the heat for operating the thermostat is transmitted thereto through a medium in close proximity to the heat dissipating surface. Thus instead of maintaining a uniform temperature at the point of heat generation, the control temperature is that of the heat dissipating surface and where the rate of dissipation is high, a higher temperature will be permitted in the heat generating element.

While the invention is applicable to various heating devices as well as laundry irons, the latter only is described and illustrated in the accompanying drawing in which Figure 1 is a longitudinal section through a portion of a laundry iron showing the thermostat applied thereto;

Figure 1:
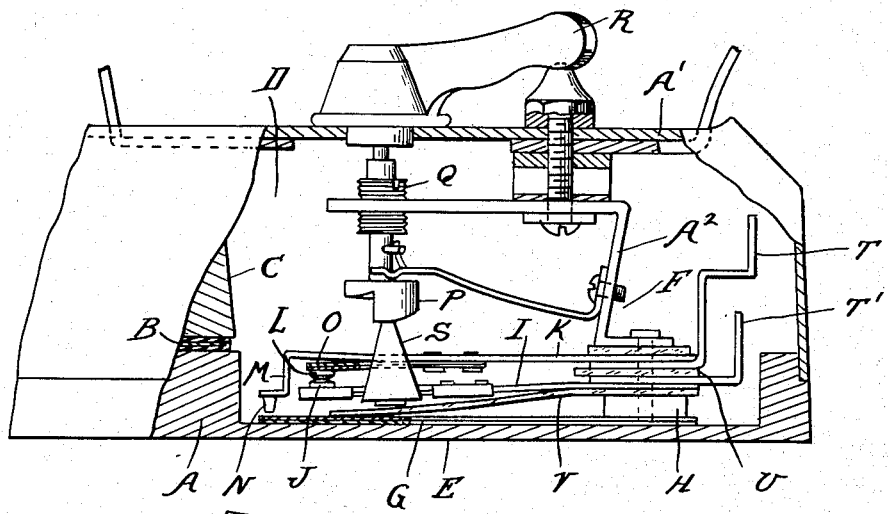
Figure 3:
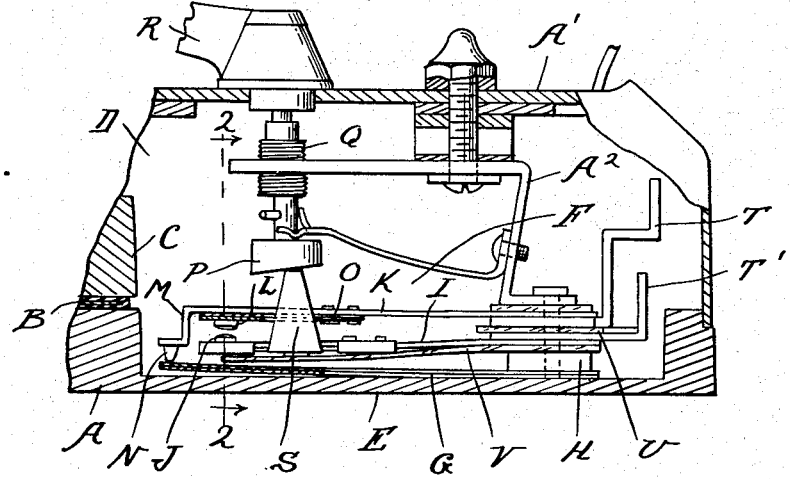
Figure 3 is a view similar to Figure 1 showing the parts in the different positions of adjustment.
Figure 2:
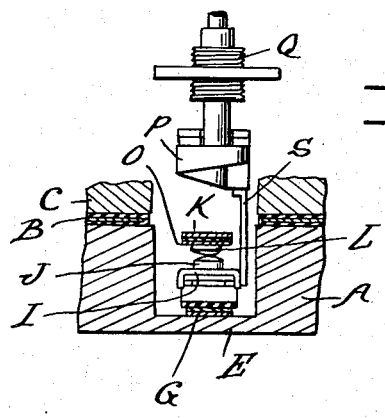
Figure 2 is a cross section on line 2—2 of Figure 1.

The laundry iron to which the thermostat is applied comprises a base portion A above which is placed a heating unit B secured thereto by the heat distributing and clamping plate C. D is a recess extending through the plate C and downward in the base A, leaving only a comparatively thin bottom portion E between the same and the ironing surface. F is a thermostatic electric switch located within the recess D and so positioned as to receive heat for its operation through the medium of the thin bottom portion E. As this bottom portion E is not in direct contact with the heating element B it must receive its heat from the surrounding portion of the base A. Also by reason of the fact that its point of juncture with the surrounding portion of the base is only slightly above the ironing surface, its temperature will be substantially that of the ironing surface which is always lower than that of the upper portion of the base.

Various specific constructions of thermostatic switches may be employed, it being only essential that the temperature for operation should be derived through the medium of the portion E. However, as shown, the construction is as follows: G is a thermostatic element such as a composite metal bar, one face of which normally lies in close proximity to the top face of the bottom E, being supported in this position from the top casing A' through the medium of a depending bracket arm $A^2$. The supported end of the thermostatic bar is attached to a block H upon which is mounted the electric switch. This switch comprises a resilient strip I carrying at its outer end one of the contacts J and above the strip I and insulated therefrom is a second resilient strip K carrying at its outer end a cooperating contact L. The strip K has an extension M which is bent downward and has a mechanical contact N adjacent to the thermostatic bar G. All of these parts are clamped to and supported by the bracket arm $A^2$. Thus as so far described, whenever the temperature of the bar G is raised sufficiently by heat conducted thereto through the thin bottom portion E, this bar G will warp upward and through the medium of the mechanical contact N and extension M will raise the flexible strip K separating the contact L from the contact J and interrupting the electrical current.

It is desirable to prevent too frequent opening and closing of the switch or what is termed "fluttering", as this has a tendency to burn out the contacts and also to produce disturbance in any radio apparatus in the vicinity. To accomplish this result, a second thermostat is employed, this being operated by electrical heat generated directly therein. As shown, the second thermostat is a composite bar O secured to a portion of the flexible strip K and adapted when heated by electrical current flowing therethrough to warp said strip inward so as to cause the contact L to move towards the contact J. When the iron is cool the strip O will be warped outward and the contacts L and J will not be closed until the thermostatic bar G is warped downward a sufficient distance. However, as soon as the contacts L and J are closed the bar O will be electrically heated so as to be warped in a downward direction and consequently the switch will not be open until the temperature falls somewhat lower than the temperature at which the switch was closed. This will effectually prevent "fluttering".

To regulate the temperature at which the thermostat operates, there is provided a suitable adjusting device such as the cam P having a screw threaded shank Q engaging the bracket $A^2$, and an operating handle R above the casing A' of the iron. This cam P forms a stop for engaging a post S on the resilient strip I and by adjusting the cam the position of the stop is altered.

The electrical current is conducted to the thermostat through suitable terminal posts T and T' clamped respectively in contact with the strips I and K and insulated from each other by the intermediate insulating strip U. An insulator strip V is also preferably placed between the resilient strip I and the thermostatic bar G to avoid any accidental electrical connection between these members.

With the construction above described, the location of the thermostatic element G is such as to be shielded from all heat of the iron other than that derived from the thin bottom portion E which in turn must receive its heat by conduction from the portion of the base A which is adjacent to the ironing surface. Thus whenever the iron is being used on a wet garment which rapidly absorbs the heat from the ironing surface, the thermostatic switch will remain closed even though the temperature of the heating unit may be considerably higher than the opening temperature of the switch. In other words, the switch responds to the temperature of the ironing surface rather than to the temperature of any other part of the iron. Thus while the ironing surface is at all times protected from overheating, it is maintained at a temperature for efficiently performing its work.

Some of the subject matter disclosed but not claimed in this application is claimed in our copending application, Serial No. 751,594, filed November 5, 1934.

What we claim as our invention is:

1. An electric laundry iron comprising a heat distributing base of substantial thickness having a recess forming a thin bottom surface of substantially uniform thickness, a heating element contacting with the upper surface of said base, a pressure plate above said heating element having an opening extending completely therethrough registering with the recess in said base, a frame secured to said iron independently of said pressure plate and base plate and independently removable, said frame having a portion depending within the opening in said pressure plate, a bimetallic thermostatic bar having one end thereof rigidly connected to the depending portion of said frame, said thermostatic bar extending laterally from said support in substantial contact with the upper surface of said thin bottom portion and adapted to warp in a direction away from said bottom portion upon increase in temperature whereby the temperature of said bar is determined by the temperature of said thin bottom portion substantially independently of the temperature of the remaining portions of the said base and said pressure plate, a non-thermostatic member operatively engaging the free end of said thermostatic bar to be moved thereby and a switch within said recess automatically operable by the movement of said non-thermostatic member for energizing and de-energizing said heating element in accordance with the temperature of said thin bottom portion.

2. An electric laundry iron comprising a heat distributing base of substantial thickness having a recess forming a thin bottom surface of substantially uniform thickness, a heating element contacting with the upper surface of said base, a pressure plate above said heating plate having an opening extending completely therethrough registering with the recess in said base, a frame mounted independently of said pressure plate and said base plate and quickly detachably mounted to said iron, said frame having a portion depending within the opening in said pressure plate and extending into said recess in said base plate, a bimetallic thermostatic bar having one end thereof rigidly connected to the depending portion of said frame and extending laterally from said frame parallel to and in substantial contact with the upper surface of said thin bottom portion, said thermostatic bar being adapted to warp in a direction away from said bottom portion upon increase in temperature, a pair of spring strips also secured to said depending portion of said frame, contacts carried by said spring strips and arranged within said recess, an adjustable abutment carried by said frame for limiting the upward movement of one of said spring strips and means operatively connecting said thermostatic bar with the other of said spring strips to separate said contacts upon predetermined upward warping of said thermostatic bar.

3. An electric laundry iron comprising a heat distributing base of substantial thickness having a recess forming a thin bottom surface of substantially uniform thickness, a heating element contacting with the upper surface of said base, a pressure plate above said heating element having an opening extending completely therethrough registering with the recess in said base, a top casing, a frame secured to said top casing independent of direct connection to said base plate and pressure plate and removable with said top casing, said frame having a portion depending within the opening in said pressure plate, a bimetallic thermostatic bar having one end thereof rigidly connected to the depending portion of said frame, said thermostatic bar extending laterally from said support in close proximity to the upper surface of said thin bottom portion and adapted to warp in one direction upon increase in temperature whereby the temperature of said bar is determined by the temperature of said thin bottom portion substantially independently of the temperature of the remaining portions of the said base and said pressure plate, a non-thermostatic member operatively engaging the free end of said thermostatic bar to be moved thereby and a switch within said recess automatically operable by the movement of said non-thermostatic member for energizing and de-energizing said heating element in accordance with the temperature of said thin bottom portion.

4. An electric laundry iron comprising a heat distributing base of substantial thickness having a recess forming a thin bottom surface of substantially uniform thickness, a heating element contacting with the upper surface of said base, a pressure plate above said heating element having an opening extending completely therethrough registering with the recess in said base, a frame secured to said iron independently of said pressure plate and base plate and independently removable, said frame having a portion depending within the opening in said pressure plate, a bimetallic thermostatic bar having one end thereof rigidly connected to the depending portion of said frame, said thermostatic bar extending laterally from said support in substantial contact with the upper surface of said thin bottom portion and adapted to warp in one direction upon increase in temperature whereby the temperature of said bar is determined by the temperature of said thin bottom portion substantially independently of the temperature of the remaining portions of the said base and said pressure plate, a non-thermostatic member operatively engaging the free end of said thermostatic bar to be moved thereby and a switch within said recess automatically operable by the movement of said non-thermostatic member for energizing and deenergizing said heating element in accordance with the temperature of said thin bottom portion.

5. An electric laundry iron comprising a heat distributing base of substantial thickness having a recess forming a thin bottom surface of substantially uniform thickness, a heating element contacting with the upper surface of said base, a pressure plate above said heating element having an opening extending completely therethrough registering with the recess in said base, a frame secured to said iron independently of said pressure plate and base plate and independently removable, said frame having a portion depending within the opening in said pressure plate, a bimetallic thermostatic bar having one end thereof rigidly connected to the depending portion of said frame, said thermostatic bar extending laterally from said support in close proximity to the upper surface of said thin bottom portion and adapted to warp in a direction away from said bottom portion upon increase in temperature whereby the temperature of said bar is determined by the temperature of said thin bottom portion substantially independently of the temperature of the remaining portions of the said base and said pressure plate, a non-thermostatic member operatively engaging the free end of said thermostatic bar to be moved thereby and a switch within said recess automatically operable by the movement of said non-thermostatic member for energizing and deenergizing said heating element in accordance with the temperature of said thin bottom portion.

FRANK KUHN.
LAURENCE H. THOMAS.